United States Patent [19]

McKelvey et al.

[11] Patent Number: 4,527,005

[45] Date of Patent: Jul. 2, 1985

[54] SPRING LOADED THERMOCOUPLE MODULE

[75] Inventors: Thomas E. McKelvey, Solana Beach; Joseph J. Guarnieri, San Diego, both of Calif.

[73] Assignee: The United States of America as represented by the United States Department of Energy, Washington, D.C.

[21] Appl. No.: 589,253

[22] Filed: Mar. 13, 1984

[51] Int. Cl.$^3$ .............................................. H01V 1/02
[52] U.S. Cl. ...................................... 136/221; 136/230
[58] Field of Search .............. 136/230, 221, 229, 235; 73/351, 352, 359

[56] References Cited

U.S. PATENT DOCUMENTS 3,681,990  8/1972  Barrett et al. .................... 136/221
4,101,343  7/1978  Feichter et al. .................. 136/221

FOREIGN PATENT DOCUMENTS 932260  7/1963  United Kingdom ............... 136/221

Primary Examiner—Ben R. Padgett
Assistant Examiner—T. J. Wallen
Attorney, Agent, or Firm—Bruce R. Mansfield; John M. Albrecht; Judson R. Hightower

[57] ABSTRACT

A thermocouple arrangement is provided for mounting in a blind hole of a specimen. The thermocouple arrangement includes a cup-like holder member, which receives an elongated thermal insulator, one end of which is seated at an end wall of the holder. A pair of thermocouple wires, threaded through passageways in the insulator, extend beyond the insulator member, terminating in free ends which are joined together in a spherical weld bead. A spring, held captive within the holder, applies a bias force to the weld bead, through the insulator member. The outside surface of the holder is threaded for engagement with the blind hole of the specimen. When the thermocouple is installed in the specimen, the spherical contact surface of the weld bead is held in contact with the end wall of the blind hole, with a predetermined bias force.

16 Claims, 4 Drawing Figures

SPRING LOADED THERMOCOUPLE MODULE

CONTRACTUAL ORIGIN OF THE INVENTION

The United States Government has rights in this invention pursuant to Subcontract No. S-01933-F with GA Technologies, Inc. under Contract No. DE-AC02-76-CH03073 between the Princeton University and U.S. Department of Energy.

BACKGROUND OF THE INVENTION

This invention pertains to thermocouple arrangements, and in particular to compact spring-loaded thermocouples.

Various thermocouple arrangements have been proposed, but the need still exists, especially in thermocouple array configurations, for a longitudinally compact thermocouple having a self-contained modular design. Some applications can tolerate a rigid thermocouple installation such as that provided by instrumented washers or instrumented pipe-clamps, which rely on pre-load stress. However, the present invention is directed to applications that require a resilient or biased thermocouple mounting. The latter arrangement is required, for example, in dynamic thermal environments, which subject the thermocouple to variations in pressure, with resulting variations in the degree and consistency of the thermal contact between the thermocouple and the monitored surface.

It is therefore an object of the present invention to provide a direct-contact modular thermocouple arrangement that is comprised of a minimum number of inexpensive components.

Another object of the present invention is to provide a modular thermocouple arrangement that is longitudinally-compact and that offers a resilient mounting to a specimen to be monitored.

Yet another object of the present invention is to provide a modlar thermocouple that is easily installed in a simple drilled and tapped blind hole.

Another object of the present invention is to provide a thermocouple arrangement of the above-described type which is comprised of non-magnetic high temperature materials that are compatible with a vacuum environment, such as that encountered in a plasma confinement device.

SUMMARY OF THE INVENTION

These and other objects of the present invention are provided in a thermocouple assembly comprised of first and second thermal insulator members which are joined end-to-end and have two continuous passageways extending therethrough. First and second thermocouple wires, disposed in the passageways, extend beyond the second insulator member, being joined together in a spherical bead tip which is formed by resistance welding or the like. The second insulator member, which is closest to the weld bead, includes a shoulder portion of reduced outside diameter. The two insulator members and the thermocouple wires, when joined, together to form an assembly, are installed in a cup-like holder member. The holder member, which is generally U-shaped in cross-section, is comprised of an annular side wall, and a disc-like bottom wall having a central aperture formed therein for receiving the insulator shoulder portion. The insulator and thermocouple arrangement is resiliently mounted in the holder by a spring member which applies an outwardly directed force to the spherical bead. The outside surface of the holder side wall is threaded to provide ready insertion into a drilled and tapped blind hole located in the specimen to be monitored. When the thermocouple arrangement is fully installed, the bead formed between the thermocouple wires contacts the bottom of the blind hole so as to be completely recessed within the holder. The spring member provides a predetermined bias force which maintains contact between the bead and the specimen to be monitored.

BRIEF DESCRIPTION OF THE DRAWINGS

In the drawings, wherein like members are referenced alike.

DETAILED DESCRIPTION OF THE PREFERRED EMBODIMENT

Figure 1:
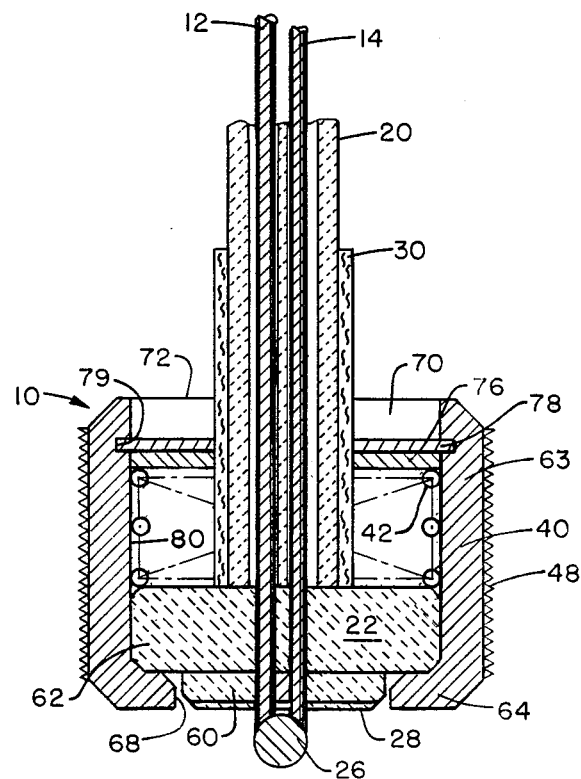
FIG. 1 shows a schematic cross-section of the completed thermocouple arrangement of the present invention.
Figure 2:
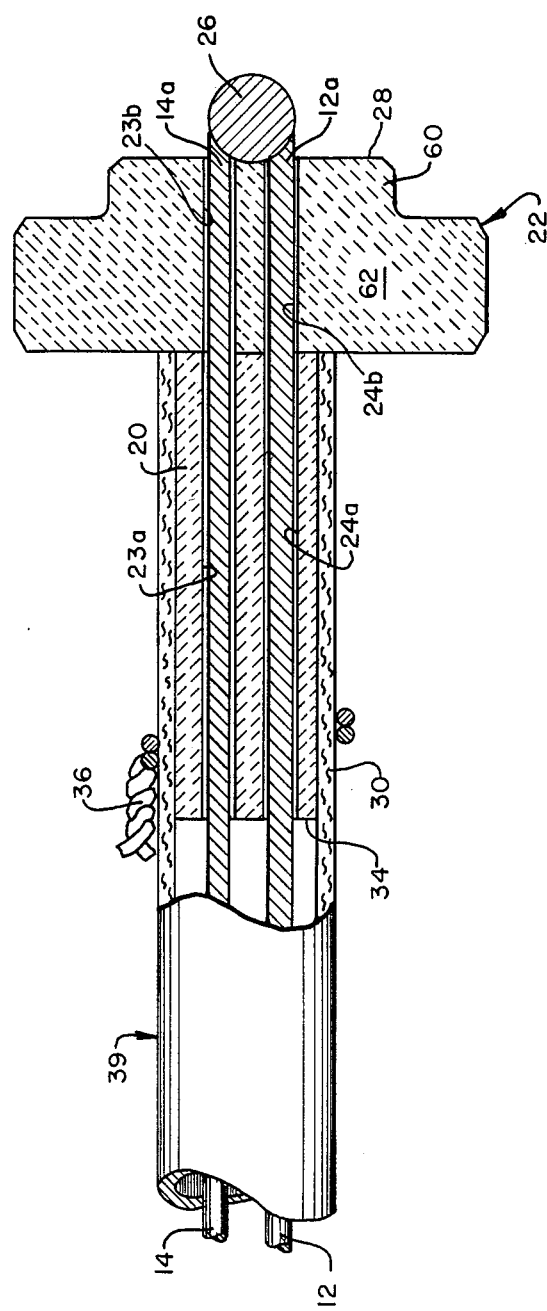
FIG. 2 is a partial cross-sectional view.

Referring now to the drawings, and especially to FIGS. 1 and 2, thermocouple assembly 10 includes two thermocouple wires 12, 14 disposed in first and second thermal insulator portions 20, 22. Wires 12, 14 are preferably formed of a Chromel-Constantan composition because of the desired temperature range they afford, but any suitable material may be substituted. First insulator member 20 is of a generally elongate cylindrical configuration with two spaced-apart passageways 23a, 24a extending parallel to the axis of the cylinder. The second insulator member 22 is generally cylindrical, being coaxially aligned with the first insulator member 20. As will become apparent herein, the two insulator members are held in contact with each other by compressional forces of a spring bias arrangement, and need not be joined by adhesives and the like. In the preferred embodiment insulator 22 takes the form of an abbreviated cylinder having an outside diameter significantly larger than that of insulator 20. Passageways 23b, 24b are aligned with passageways 23a, 24a of insulator 20 to form continuous channels through which the thermocouple wires can be inserted. Both insulator members are preferably formed of a high temperature, nonconductive ceramic material.

The free ends 12a, 14a of thermocouple wires 12, 14 are joined together in a spherical weld bead 26 located immediately adjacent the free end 28 of insulator 22. A thermal insulating sheath 30, which encases thermocouple wires 12, 14 is attached to the free end 34 of insulator 20 by a lockwire 36 or the like fastening means. The assembly described thus far (indicated by numeral 39—see FIG. 2) is installed within cup-like thermocouple holder 40, with spring 42 providing resilient mounting of the assembly within holder 40. Spherical bead 26 is mounted for partial recession within housing 40 with a biasing energy stored in spring 42.

Figure 3:
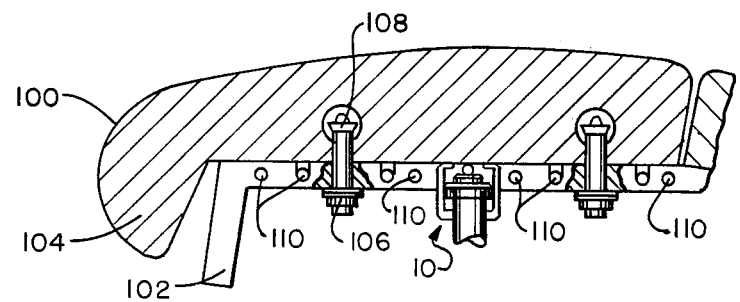
FIG. 3 shows the thermocouple arrangement of the present invention mounted in a specimen to be monitored.
Figure 4:
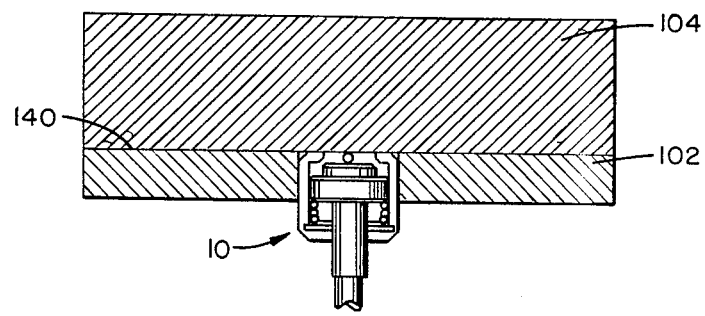
FIG. 4 shows the arrangement of FIG. 3 in greater detail.

Housing 40 is generally U-shaped in cross-section, being comprised of an annular sidewall 63 and a circular disk-like end wall 64. With reference to FIGS. 3 and 4, housing 40 can be mounted by any convenient method within the object to be monitored. A preferred method of mounting thermocouple assembly 10 is to provide external thread means 48 on the outside surface of sidewall 63. The object to be monitored is drilled with a blind hole which is then tapped, and holder 40 is threadingly mounted in the tapped hole. The depth of the blind hole is dimensioned relative to the length of holder 40 such that when thermocouple 10 is fully inserted, weld bead 26 is retracted within holder 40, with end wall portion 64 of holder 40 contacting the bottom of the blind hole. In this manner, a predetermined loading or bias force is applied to weld bead 26 through the predetermined compression of spring 42.

As can be seen in FIGS. 1 and 2, insulator 22 is comprised of a major body portion 62 having a first predetermined outside diameter, and a reduced outside diameter shoulder portion 60. It should be noted that the reduced diameter shoulder portion 60 of insulator 22 has a thickness approximately equal to the thickness of end wall portion 64 of holder 40, that portion located immediately adjacent insulator 22 in the final assembly. Aperture 68 is formed in end wall 64 of holder 40, to allow protrusion of weld bead 26 and shoulder 60 therethrough, while obstructing the passage of major body portion 62.

The outer diameter of insulator 22 is dimensioned slightly smaller than aperture 70 formed in second end portion 72 of holder 40. End portion 72, located adjacent insulator 20, opposes end wall 64 which is located adjacent insulator member 22. After insertion of insulator portions 20, 22 and spring 42, (together comprising assembly 39) within holder 40, a washer 76 (of outside diameter approximately equal to that of insulator 22) and a split ring retaining member 78 are installed adjacent end portion 72 to hold the assembly 39 within holder 40. Retaining ring 78 is received in a groove 79 formed in an inside surface 80 of sidewall 63. Washer 76 and retaining ring 78 are preferably formed of 316 Stainless Steel, as is holder 40, and spring 42 is formed of a high temperature spring material.

The thermocouple arrangement of the present invention is employed in the PPPL Tokamak Fusion Test Reactor project (TFTR) to monitor thermal loading of the tiles of a plasma limiter blade, which are exposed to high heat flux from the plasma. The limiter blade is shown and described in U.S. patent application Ser. No. 435,791 filed Oct. 21, 1982 which is herein incorporated by reference to the extent necessary to illustrate the present invention.

Referring now to the partial views of FIGS. 3 and 4, the preferred embodiment of the present invention is shown mounted in a plasma limiter blade 100 which is preferably formed of a backing plate 102 which carries a plurality of graphite tiles 104. A coating of titanium carbide or other non-reactant material is applied to tiles 104 to resist sputtering and reduce erosion of the graphite material by arcs, sublimation, and sputtering from the high energy plasma. The tiles, approximately 4.7 centimeters thick, are preferably formed of Poco AXF-5Q graphite and are shaped to distribute the heat flux evenly over the surface of the tiles. The backing plates, which provide the structural support required to resist disruption and fault induced loads, are made of a low magnetic permeability material (such as nickel alloy, Stainless Steel 316 or Stainless Steel 304) which has sufficient strength to withstand the mechanical loading expected during plasma operation. Such loading may result from plasma disruptions which induce rapidly changing magnetic fields (with attendant eddy currents) in the limiter blade which react with the remaining magnetic field. Alternately, the loading may result during plasma faults when as much as 24 kA of the plasma current may be grounded through the backing plates to provide a current crossing the remaining magnetic field.

The underside of each tile is generally planar and is held in heat transfer contact with the backing plate by bolts 106 which are threaded into nuts 108 held captive within the tile. Each backing plate has channels 110 formed therein for circulating coolant through the backing plate to conduct heat away from the tiles.

The temperature of the graphite tiles is continuously monitored with an array of thermocouples 10 which are installed in backing plate 102. The weld bead junction 60 of the thermocouple wires is spring loaded as described above so as to maintain a constant predetermined pressure against the graphite tile 104. An array of thermocouples 10 directly monitors the local temperatures of the back surface of the tile, and thermal analyses permit extrapolation to the front surface of each tile.

The installation of thermocouple assembly 10 in limiter blade 100 can be accomplished in two ways. The completed limiter blade assembly, wherein backing plate 102 and tiles 104 are joined together, may be drilled and tapped to form a blind hole which receives the thermocouple assembly. Alternatively, the backing plate 102 can be drilled and tapped, and the thermocouple assembly can be inserted therein such that the spherical bead tip is allowed to protrude beyond inner backing plate surface 140 a predetermined distance. Thereafter, tile 104 is joined to backing plate 102 so as to compress spring 42. In either event, it is not necessary that the end wall portion of holder 40 contact the bottom wall of the blind hole, or the tile of the second mentioned alternative.

The embodiment of the invention in which an exclusive property or privilege is claimed are defined as follows:

1. A thermocouple arrangement for mounting in a specimen to be monitored, said specimen having a side wall and an end wall therein so as to define a blind hole for mounting said thermocouple arrangement, said thermocouple arrangement comprising;

an elongated thermal insulator member having first and second end portions of predetermined dimensions, shoulder means disposed adjacent said second end portion and dimensioned smaller than said first end portion, first and second passageways extending through said insulator in a direction generally parallel to the longitudinal axis thereof;

a cup-shaped holder member, having a hollow cylindrical wall portion, a first open end and a second end enclosed by a generally disc-shaped end wall member having an aperture formed therein for receiving said shoulder means of said insulator member, said second end portion of said insulator member disposed within said holder member, adjacent said end wall thereof;

spring bias means disposed within said holder for maintaining engagement between said second end portion of said insulator and said end wall of said holder;

first and second thermocouple wires disposed in said first and said second passageways of said thermal insulator and extending beyond said shoulder means, terminating in first and second free ends, respectively;

a spherical thermally conductive bead joining said first and said second free ends to said thermocouple wires together so as to form a spherical thermal contact surface;

fastening means formed on an outside surface of said holder for engagement with said side wall of said specimen to be monitored, such that when said thermocouple arrangement is fastened to said specimen, said spherical bead contacts said end wall of said blind hole, said shoulder of said insulator member and a portion of said spherical bead recessed within said holder, with said spring bias means maintaining said spherical bead in thermal contact with said end wall of said blind hole.

2. The arrangement of claim 1 wherein said fastening means includes external threads formed in an outside surface of said holder, for threaded engagement with internal threads formed on said sidewall of said specimen defining said blind hole.

3. The arrangement of claim 2 wherein said insulator is comprised of first and second predeterminedly-dimensioned coaxially aligned cylinders each having first and second ends and positioned end-to-end, said second cylindrical portion having an outside diameter substantially larger than an outside diameter of said first cylindrical portion and smaller than said first open end of said holder so as to allow insertion of said second cylindrical portion therein.

4. The arrangement of claim 3 wherein said second cylindrical portion has a first surface which overlies said end wall portion of said holder, and a second opposed surface which contacts said spring bias means.

5. The arrangement of claim 4 wherein said side wall of said holder contains groove means adjacent said first open end, for receiving a retaining ring which holds said spring bias means captive within said holder.

6. The arrangement of claim 5 wherein said second cylindrical portion of said insulator member contacts said end wall of said holder to limit travel of said insulator member through said holder and to hold said spring bias means captive within said holder.

7. The arrangement of claim 6 wherein portions of said insulator member end wall immediately adjacent said aperture formed therein have a predetermined thickness and said shoulder means has a predetermined thickness approximately equal thereto.

8. The arrangement of claim 6 wherein portions of said insulator member end wall immediately adjacent said aperture formed therein have a predetermined thickness and said shoulder means has a predetermined thickness approximately equal thereto.

9. The arrangement of claim 7 wherein said thermocouple wires comprise Chromel-Constantan.

10. The arrangement of claim 9 wherein said spherical bead is formed by a welding of said free ends of said thermocouple wires.

11. A thermocouple arrangement for use in a plasma confinement device to monitor the temperature of a member disposed within a vacuum containment vessel of the device, said member having a side wall and an end wall formed therein so as to define a blind hole for mounting said thermocouple arrangement, said thermocouple arrangement comprising;

an elongated thermal insulator member having first and second end portions of predetermined dimensions, shoulder means disposed adjacent said second end portion and dimensioned smaller than said first portion end, first and second passageways extending through said insulator in a direction generally parallel to the longitudinal axis thereof;

a holder member, generally U-shaped in cross-section, including a hollow cylindrical wall portion having first and second open ends said second end enclosed by a generally disc-shaped end wall member having an aperture formed therein for receiving said shoulder means of said insulator member, said second end portion of said insulator member disposed within said holder member, adjacent said end wall thereof;

spring bias means disposed within said holder for maintaining engagement between said second end portion of said insulator and said end wall of said holder;

first and second thermocouple wires disposed in said first and said second passageways of said thermal insulator and extending beyond said shoulder means, terminating in first and second free ends, respectively;

a spherical thermally conductive weld bead joining said first and said second free ends of said thermocouple wires together so as to form a spherical thermal contact surface;

external thread means formed on an outside surface of said holder for engagement with internal threads formed in said side wall of said specimen to be monitored, such that when said thermocouple arrangement is threadingly engaged with said specimen, said spherical bead contacts said end wall of said blind hole, said shoulder of said insulator member and a portion of said spherical bead recessed within said holder, with said spring bias means maintaining said spherical bead in thermal contact with said end wall of said blind hole.

12. The arrangement of claim 11 wherein said insulator is comprised of first and second predeterminedly-dimensioned coaxially aligned cylinders each having first and second ends and positioned end-to-end, said second cylindrical portion having an outside diameter substantially larger than an outside diameter of said first cylindrical portion and smaller than said first open end of said holder so as to allow insertion of said second cylindrical portion therein.

13. The arrangement of claim 12 wherein said second cylindrical portion has a first surface which overlies said end wall portion of said holder, and a second opposed surface which contacts said spring bias means.

14. The arrangement of claim 13 wherein said side wall of said holder contains groove means adjacent said first open end, for receiving a retaining ring which holds said spring bias means captive within said holder.

15. The arrangement of claim 14 wherein said second cylindrical portion of said insulator member contacts said end wall of said holder to limit travel of said insulator member through said holder and to hold said spring bias means captive within said holder.

16. The arrangement of claim 15 wherein said member comprises a limiter blade which contacts said plasma for positional control thereof.

* * * * *